United States Patent
Sundberg et al.

(10) Patent No.: US 9,747,707 B2
(45) Date of Patent: Aug. 29, 2017

(54) METHOD AND ARRANGEMENT FOR 3D IMAGE PRODUCTION

(71) Applicant: EIGENOR OY, Sodankyla (FI)

(72) Inventors: Pauli Sundberg, Helsinki (FI);
Markku Markkanen, Sodankyla (FI);
Jorn Sierwald, Kiel (DE); Timo Multamaki, Aska (FI)

(73) Assignee: Eigenor, Aska (FI)

( * ) Notice: Subject to any disclaimer, the term of this patent is extended or adjusted under 35 U.S.C. 154(b) by 692 days.

(21) Appl. No.: 14/196,600

(22) Filed: Mar. 4, 2014

(65) Prior Publication Data
US 2014/0247264 A1  Sep. 4, 2014

(30) Foreign Application Priority Data
Mar. 4, 2013  (FI) ...................................... 20135205

(51) Int. Cl.
*G06T 17/00*  (2006.01)
*G06T 11/00*  (2006.01)

(52) U.S. Cl.
CPC .................................. *G06T 11/006* (2013.01)

(58) Field of Classification Search
None
See application file for complete search history.

(56) References Cited

U.S. PATENT DOCUMENTS

| | | | | |
|---|---|---|---|---|
| 2004/0125103 A1* | 7/2004 | Kaufman | ................. | G06T 15/06 345/419 |
| 2005/0272993 A1* | 12/2005 | Ishii | ..................... | G06T 11/005 600/407 |
| 2009/0129703 A1* | 5/2009 | Takeshima | ............ | G06T 3/4053 382/299 |
| 2009/0190807 A1* | 7/2009 | Rousso | .............. | A61B 5/02755 382/128 |

(Continued)

OTHER PUBLICATIONS

Kolehmainen et al., "Statistical inversion for medical x-ray tomography with few radiographs: II. Application to dental radiology", Physics Medicine Biology, 2003, vol. 48, pp. 1465-1490.

(Continued)

*Primary Examiner* — Barry Drennan
*Assistant Examiner* — Khoa Vu

(57) ABSTRACT

An image is produced of a target region from tomographic measurements through statistical inversion. The target region is mapped with a grid of voxels. Unknowns in the voxels are the components of a vector-valued variable. A next version of the vector-valued variable is repeatedly generated by drawing for each component a value from a conditional distribution. Elements of a theory matrix indicate, what is the contribution of each voxel in the grid to a detection result. The non-zero elements of the theory matrix are stored in a compressed form. A proper subset of the elements of the theory matrix is decompressed for either updating the quantity Ax and/or calculating the quantity $A_j^T(Ax)$, where A is the theory matrix, x is the vector-valued variable and $A_j^T$ is the transpose of the j:th column of the theory matrix.

12 Claims, 7 Drawing Sheets

(56) References Cited

U.S. PATENT DOCUMENTS

2009/0201291 A1* 8/2009 Ziv .................. A61B 5/055
                    345/424

OTHER PUBLICATIONS

Saad, Youcef, "Sparskit: a basic tool kit for sparse matrix computations", Version 2, Jun. 6, 1994.
Vierinen, Juha, "On statistical theory of radar measurements", Aalto University, School of Science, Department of Information and Computer Science, 2012, Doctoral Dissertations 115/2012.

* cited by examiner $$m = A \quad x + \varepsilon$$

1501  1505  1502  1503  1504

1506

1511  1512  1513 1514  1515

| 1 | 0 | 0 | 0 | 1 | 1 | 0 | 1 |

$$\begin{pmatrix} m_1 \\ m_2 \\ m_3 \end{pmatrix} = \begin{pmatrix} A_1 \\ A_2 \\ A_3 \end{pmatrix} x + \begin{pmatrix} \varepsilon_1 \\ \varepsilon_2 \\ \varepsilon_3 \end{pmatrix}$$

Fig.16

METHOD AND ARRANGEMENT FOR 3D IMAGE PRODUCTION

TECHNICAL FIELD

The invention concerns in general the technical field of reconstructing (at least) three-dimensional images from measurement data, which typically comes from a two-dimensional sensor. Especially the invention concerns the use of a theory matrix for reconstructing an image so that the requirements for available memory and other aspects of computer capacity remain reasonable.

BACKGROUND OF THE INVENTION

Statistical inversion, also called Bayesian statistics, is a method for reconstructing an image from measurement data. Typically the image is a representation of the values of a parameter, like attenuation coefficient for a particular kind of radiation, in a large number of points of a three-dimensional target region, and the measurement data comes from a two-dimensional imaging detector. As an example, we may consider the tomographic X-ray imaging of a part of a human or animal body, although it must be remembered that 3D imaging and statistical inversion can be equally applied also to a large number of other purposes.

FIG. 1 illustrates a basic principle of computerised tomography with sparse angle data in two dimensions. An object 102 is irradiated from a limited number of directions with a radiation source, which in FIG. 1 is shown in two exemplary positions 106 and 107. A spatially sensitive detector, shown correspondingly in two positions 104 and 105, gives spatially bound attenuation information for each exposure. In FIG. 1 the circular regions 103 inside the object 102 are assumed to attenuate radiation more than the bulk of the object. Also, the region 101 outside the object is also assumed to have a different attenuation than the bulk of the object. The readings from the detector and the corresponding irradiation angles are taken into a computer 108, which uses a mathematical reconstruction method to calculate what sort of configuration of attenuation regions is located inside the object 101 in order to give just these particular attenuation profiles. The result of the calculation, which essentially represents an attenuation coefficient map of a two-dimensional slice of the object 102, is shown on a display 109. In order to gather additional information for the measurement, external measurement means like a stereoscopic camera 110, a mechanical measurement arm 111 or a laser scanner 112 can be used to scan the location and form of the outer boundary of the object 102.

Bayesian statistics is known to produce very good images for limited angle tomography reconstructions. Advances in mathematical methods, explained for example in the Finnish patent number FI 116324 and the Finnish patent application number FI 20125327 (which at the time of writing this description is not yet available to the public) have advocated Bayesian statistics as a practical method for 3D image reconstruction.

When formulating a forward model for tomography, one needs to parameterize the medium in some way. FIG. 2 shows an exemplary way of doing this, by dividing the modelled target region into equally spaced pixels (in the two-dimensional case) orvoxels (in the three-dimensional case, illustrated in FIG. 2). The forward theory of the propagation of the ray along the path of each ray passing from a radiation source to the detector can then be modelled using one of many possible interpolation methods. An example of a ray is shown as 201 in FIG. 2, and the detector is illustrated schematically as 202 in FIG. 2. The grid has an exaggeratedly coarse resolution in FIG. 2 for demonstration purposes only. In practice the grid may contain thousands or even millions of voxels: at the time of writing this description a three-dimensional grid in a medical application could have e.g. 512×512×512 or even 2000×2000×2000 voxels.

The core of Bayesian statistics is the so-called likelihood function $p(m|x)$. Ignoring possible calibration parameters, the likelihood function $p(m|x)$ of a tomographic model is completely defined by the set of model parameters $x_i$, which define the two- or three-dimensional map of attenuation coefficients (or other characteristic descriptors) of the medium. The subscript i refers here in general to the way in which the model parameters are identified. For example in FIG. 2 a three-dimensional indexing scheme is utilised, with the parameters $x_{111}$ to $x_{144}$ of the 16 front voxels explicitly illustrated. Pixels of the detector are similarly indexed, so that in FIG. 2 we have a two-dimensional detector of M×N pixels and an exemplary two-dimensional indexing scheme $m_{mn}$ of detector pixels, where the indices $m \in [1,M]$ and $n \in [1,N]$. At the time of writing this description a large 2-dimensional X-ray detector may have 1000×1000 pixels.

In addition to Bayesian inversion, other approaches are known to the reconstruction of 3D images from 2D measurements. One such approach is known as the simultaneous algebraic reconstruction technique, or SART. A detailed description of a SART-based approach can be found for example in Hengyong Yu and Ge Wang: "SART-Type Image Reconstruction from a Limited Number of Projections with the Sparsity Constraint", International Journal of Biomedical Imaging, Volume 2010 (2010), Article ID 934847, 9 pages, doi:10.1155/2010/934847.

Independent of whether the mathematical approach is based on Bayesian inversion or SART, a set of detection results can be expressed in vector form as $$m = Ax + \epsilon \quad (1)$$

where m is a vector of detection results, x is a vector of unknown variables (i.e. the parameter values of interest at all voxels of the grid), and $\epsilon$ is an error term. The so-called theory matrix A contains elements that indicate, what is the contribution of each voxel in the grid to a detection result obtained at a particular pixel of the detector. Since there may be e.g. $1000^2$ pixels in the detector (and consequently $1000^2$ components in the vector m), and e.g. $2000^3$ voxels in the grid, the theory matrix A becomes very large: in this exemplary case it has $1 \cdot 10^6$ rows and $8 \cdot 10^9$ columns, which makes $8 \cdot 10^{16}$ elements in total for one projection only.

Allocating two bytes for storing the value of each element in such a theory matrix would require 16 petabytes ($16 \cdot 10^{15}$ B) of memory, which at the time of writing this description is beyond the capability of most computer systems or would at least require an exceptionally large and expensive memory. The theory matrix is relatively sparse, and only its nonzero elements need to be stored, but the required memory space is still easily at least hundreds of gigabytes. The size of detectors and the resolution required of tomographic models may be expected to increase in the future, and many imaging cases require a large number of projections, which means a corresponding increase in memory requirements. It seems that the required amount of available memory as well as the speedy access to stored data may become major bottlenecks in applying Bayesian statistics to real-life imaging tasks.

SUMMARY OF THE INVENTION

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with a first aspect of the invention, there is provided a method for producing a three-dimensional image. The method is characterized by the features recited in the characterizing part of the independent claim directed to a method.

In accordance with a second aspect of the invention, there is provided an arrangement for producing three-dimensional images. The arrangement is characterized by the features recited in the characterizing part of the independent claim directed to an arrangement.

In accordance with a third aspect of the invention, there is provided a computer program product for producing a three-dimensional image. The computer program product is characterized by the features recited in the characterizing part of the independent claim directed to a computer program product.

The objective of keeping memory requirements reasonable can be achieved by compressing the theory matrix with such a compression method that when a particular portion of the theory matrix is later needed for calculations, the compressed representation of that portion can be read from memory and the appropriate, uncompressed elements of the theory matrix can be retrieved without having to read the whole theory matrix.

In this context, storing a theory matrix in compressed form means especially such storing where the very elements of the theory matrix are stored in a compressed form, or only instructions of how to produce the actual values of the theory matrix elements are stored, so that the required memory space is significantly smaller than what would be required by storing uncompressed values of the elements. This makes a clear difference to such prior art methods where a theory matrix was "compressed" by not storing its zero-valued elements and only storing the values of the non-zero elements, but storing them as such, without any element-level compression.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF DRAWINGS

FIG. 15 illustrates an example of a way of storing theory matrix elements in compressed form, FIG. 16 illustrates the construction of a matrix equation for multiple viewing angles.

NOTE ON VOCABULARY

The following explanation of particular expressions is provided for clarifying, in which meaning these expressions are used in this document. The explanation does not aim to cover a comprehensive list of expressions used on this technical field. Common words and expressions are additionally used in the sense which a person skilled in the art of computer tomography normally uses them.

An image means a collection of graphically presented information that a human user can see. In order to make an electronic display or a printer produce an image, the image must have an electronic representation, which is a collection of digital data, discrete pieces of which represent discrete pieces of the image. The electronic representation of an image can be stored in a memory, and changed by changing some or all of the digital values that make up the electronic representation.

At the time of writing this description an image as it is displayed to a human user is seldom three-dimensional, although certain truly three-dimensional visualization techniques do exist. More commonly the image that a human user sees is two-dimensional and appears on a screen or on paper. It is common—although not completely compatible with the vocabulary adopted here—to speak of three-dimensional images, when it is meant that the electronic representation of the image consists of values associated with a three-dimensional grid, cells or voxels of which describe corresponding volume units of the real-life object. The two-dimensional image displayed to a human user is typically constructed by displaying those values of the three-dimensional electronic representation that lie in a selected image plane that intersects the grid. It is possible to make a human user perceive an image as three-dimensional by displaying two slightly different versions of a two-dimensional image, one for each eye.

Reconstructing an image refers to the thinking that the image should illustrate a real-life object as accurately as possible, so a fictitious "perfect" form of the image exists but has been "lost", and an effort is made to refine a less-than-perfect (electronic representation of an) image until it is as good as possible. Statistical inversion is used as an example of a reconstruction method in this document, but the same thinking applies also in other reconstruction methods, such as SART, filtered back projection, and others. In more general terms it can be said that an (electronic representation of an) image is produced. A three-dimensional electronic representation of an image that has been produced through statistical inversion or other reconstruction method from the measurement results obtained with a number of exposures from different direction is often called a tomographic reconstruction.

DETAILED DESCRIPTION OF EMBODIMENTS OF THE INVENTION

Figure 1:
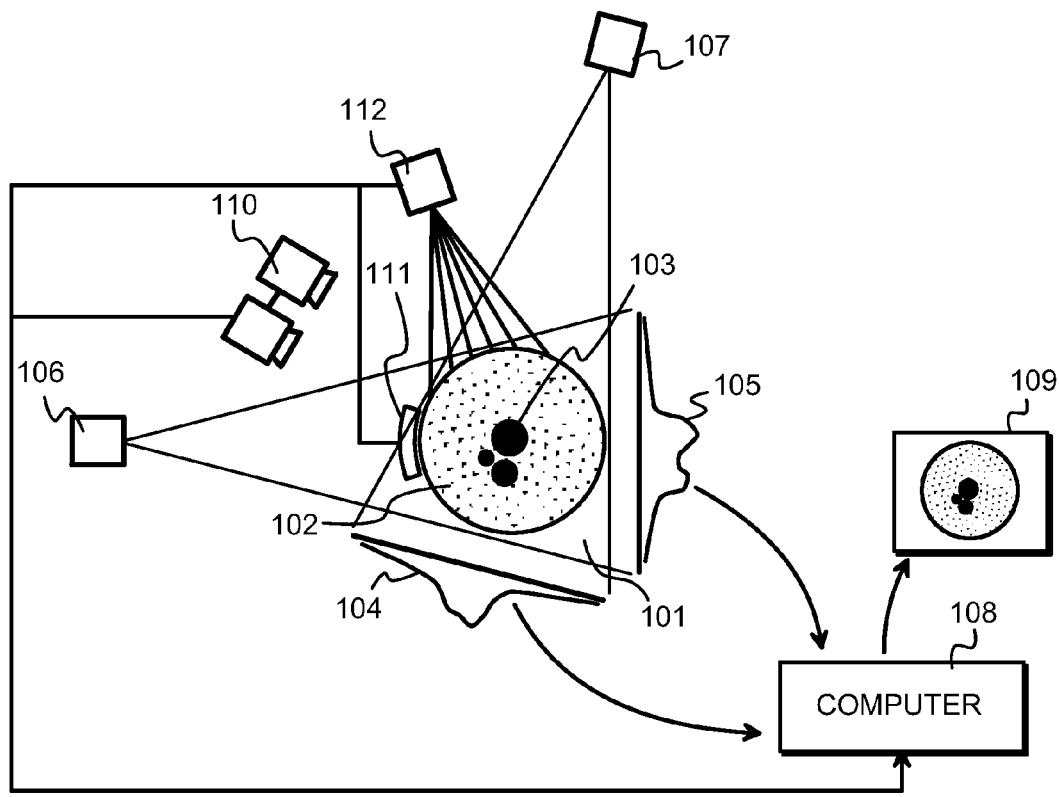
FIG. 1 illustrates the known principle of computerized tomography.
Figure 2:
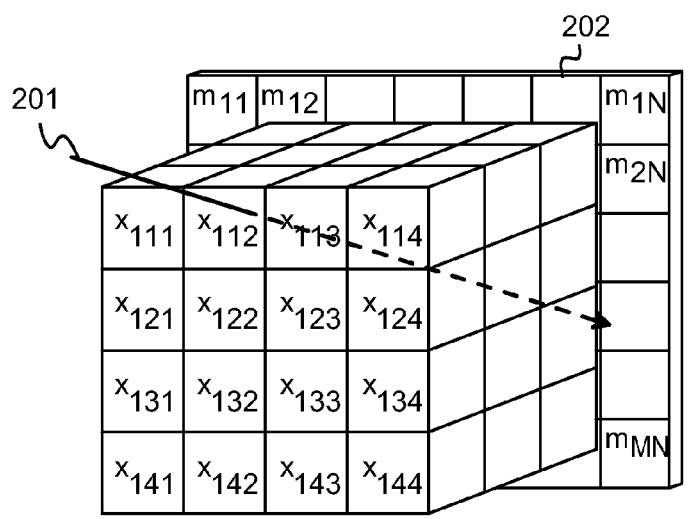
FIG. 2 illustrates the indexing of voxels in a grid and pixels in a detector.
Figure 3:
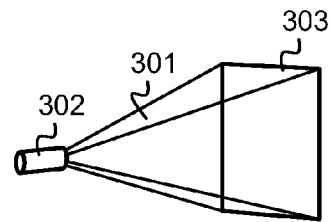
FIG. 3 illustrates the continuous distribution of radiation in a conical beam.
Figure 4:
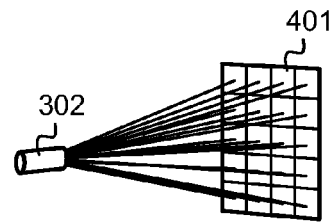
FIG. 4 illustrates the pencil beam model used for nearest neighborhood interpolation.

The real-life X-ray beam constitutes an essentially continuous distribution of radiation within the conical region 301 defined by the top point at the radiation source 302 and the bottom surface at the detector 303, as illustrated in FIG. 3. The theory model, which defines how the theory matrix will look like, models the real-life beam in some way. A simple and commonly used choice is to use a ray model, i.e. to imagine that instead of a continuous distribution, there are as many independent linear rays as there are pixels in the detector. Each ray extends from a center point of the radiation source 302 to the center point of a pixel. FIG. 4 illustrates the 20 individual rays considered in the simplified case of a detector 401 with 4×5 pixels. More elaborate models may involve e.g. four or nine linear rays from the radiation source to equally spaced points within the pixel. The grid that defines the division of the target region into voxels comes between the radiation source and the detector, so the rays pass through the voxels of the grid in various ways.

Applying a line integral with nearest neighborhood interpolation gives a theory matrix A(i,j) where a matrix element $a_{i,j}$ is the length of the segment of the i:th ray within the j:th voxel. Other methods that can be used include but are not limited to those known as trilinear interpolation with line length, distance-driven projection, separable footprints, and splash kernel. Using a line integral with nearest neighborhood interpolation gives the smallest theory matrix, i.e. the smallest number of nonzero elements. The more elaborate model is used, the worse becomes the problem of extensive requirements of memory because of the increasingly large size of the theory matrix.

Lossless Compression Approach

For the following considerations, let us assume that the receiving detector surface coincides with the YZ plane, i.e. that the coordinates of each radiation-receiving pixel in the detector are of the form $(0, r_y, r_z)$ where we use the letter r as in "receiver". Additionally we assume first that the radiation source is within the XZ plane, so that the coordinates of the radiation source are $(t_x, 0, t_z)$ with the letter t as in "transmitter". Later we explain, how some of these assumptions can be loosened without compromising the validity of the following discussion; especially the location of the transmitter in the coordinate system has relatively little importance as long as it is exactly known.

Figure 5:
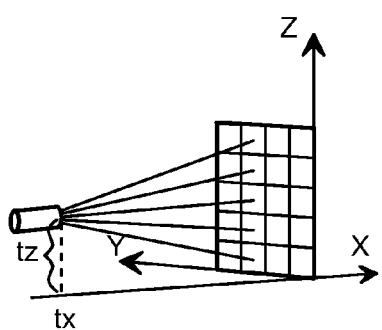
FIG. 5 illustrates a vertical fan of beams in the case of FIG. 4.
Figure 6:
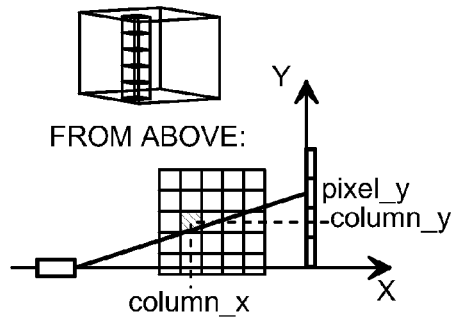
FIG. 6 illustrates the fan of beams of FIG. 5 from above.

FIG. 5 illustrates the same model as FIG. 4 above, but with only those rays visible that hit a particular vertical row of pixels. FIG. 6 illustrates the same case viewed directly from above, and with an exemplary regular rectangular grid placed between the radiation source and the detector. The grid consists in this case of 5×5×5 cubic voxels.

Viewed from above, the vertical column of five voxels that is schematically shown in the small axonometric illustration at the top of FIG. 6 is seen as the hatched square. The fan of five rays that can be seen in FIG. 5 appears as a single line in FIG. 6, because the view is directly from above. We may designate the vertical column of voxels with the coordinates column_x and column_y, as shown in FIG. 6. Similarly we may commonly designate the fan of five rays with a single index called pixel_y, because the five pixels hit by said five rays have a common y coordinate.

Figure 7:
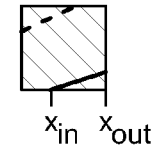
FIG. 7 illustrates one voxel in detail.

FIG. 7 is an enlarged top view of one of said five voxels. The line that represents the fan of rays in FIG. 6 passes through the hatched square, so we know that at least one of said five rays may pass through the voxel shown in FIG. 7. If it does, the x coordinates of the points where the ray goes in and comes out are $x_{in}$ and $x_{out}$ respectively. Note that there may be other rays, i.e. some of those that were not visible in FIG. 5 or 6, that also pass through the voxel shown in FIG. 7. The dash line at the top corner of the voxel's top view in FIG. 7 illustrates one such ray; it would be one of those that hit the pixels farthest in the Y direction.

Figure 8:
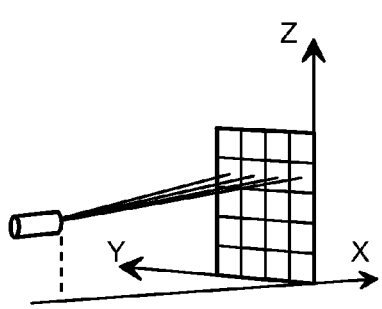
FIG. 8 illustrates a horizontal fan of beams in the case of FIG. 4.
Figure 9:
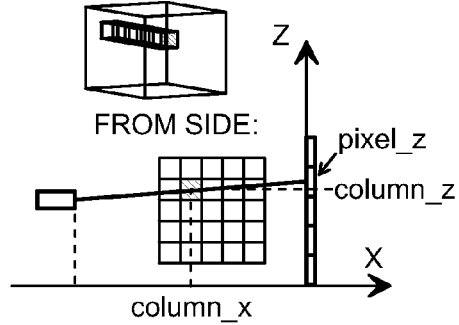
FIG. 9 illustrates the fan of beams of FIG. 8 from the side.

FIG. 8 illustrates again the same model as FIGS. 4 and 5 above, but this time with only those rays visible that hit a particular horizontal row of pixels. FIG. 9 illustrates the same case viewed directly from the side, with the same grid of 5×5×5 cubic voxels. The horizontal column of five voxels that is schematically shown at the top of FIG. 9 is seen as the hatched square. The fan of four rays from FIG. 8 appears as a single line in FIG. 9, because the view is directly from the side. The horizontal column has the coordinates column_x and column_z, as shown in FIG. 9. The fan of four rays can be designated with a single index called pixel_z, because the four pixels hit by said four rays have a common z coordinate.

Figure 10:
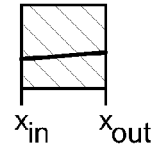
FIG. 10 illustrates one voxel in detail.

FIG. 10 is an enlarged side view of one of the five voxels of the horizontal column. At least one of the four rays seen separately in FIG. 8 and as a single line in FIG. 9 may pass through the voxel shown in FIG. 10. If it does, the x coordinates of the points where the ray goes in and comes out are again $x_{in}$ and $x_{out}$ respectively.

Figure 11:
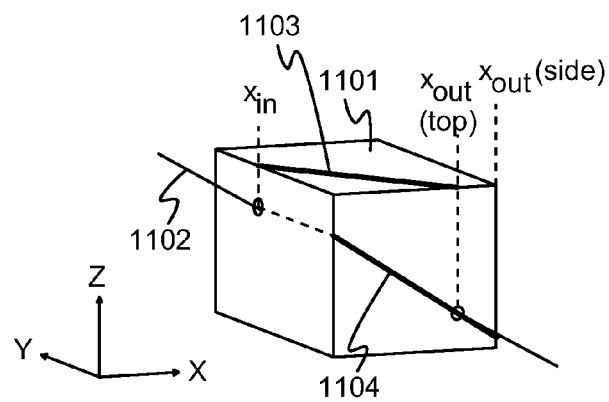
FIG. 11 illustrates an exemplary voxel and the top and side projections of a ray.

FIG. 11 is an axonometric projection of a voxel 1101, through which goes a ray 1102. The locations where the ray 1102 pierces the surface of the voxel 1101 are marked with small circles. The representation of said ray in a top view (compare to FIG. 7) is shown as line 1103 on the top face of the voxel, and the representation of the same ray in a side view is shown as line 1104 on the side face of the voxel. FIG. 11 illustrates specifically how the $x_{in}$ and $x_{out}$ coordinates are not necessarily the same in the top and side views: in this particular case the ray 1102 comes out of the side of the voxel 1101 but high enough in the Z direction so that the line 1104 extends between two opposite sides of the voxels while line 1103 does not.

Figure 12:
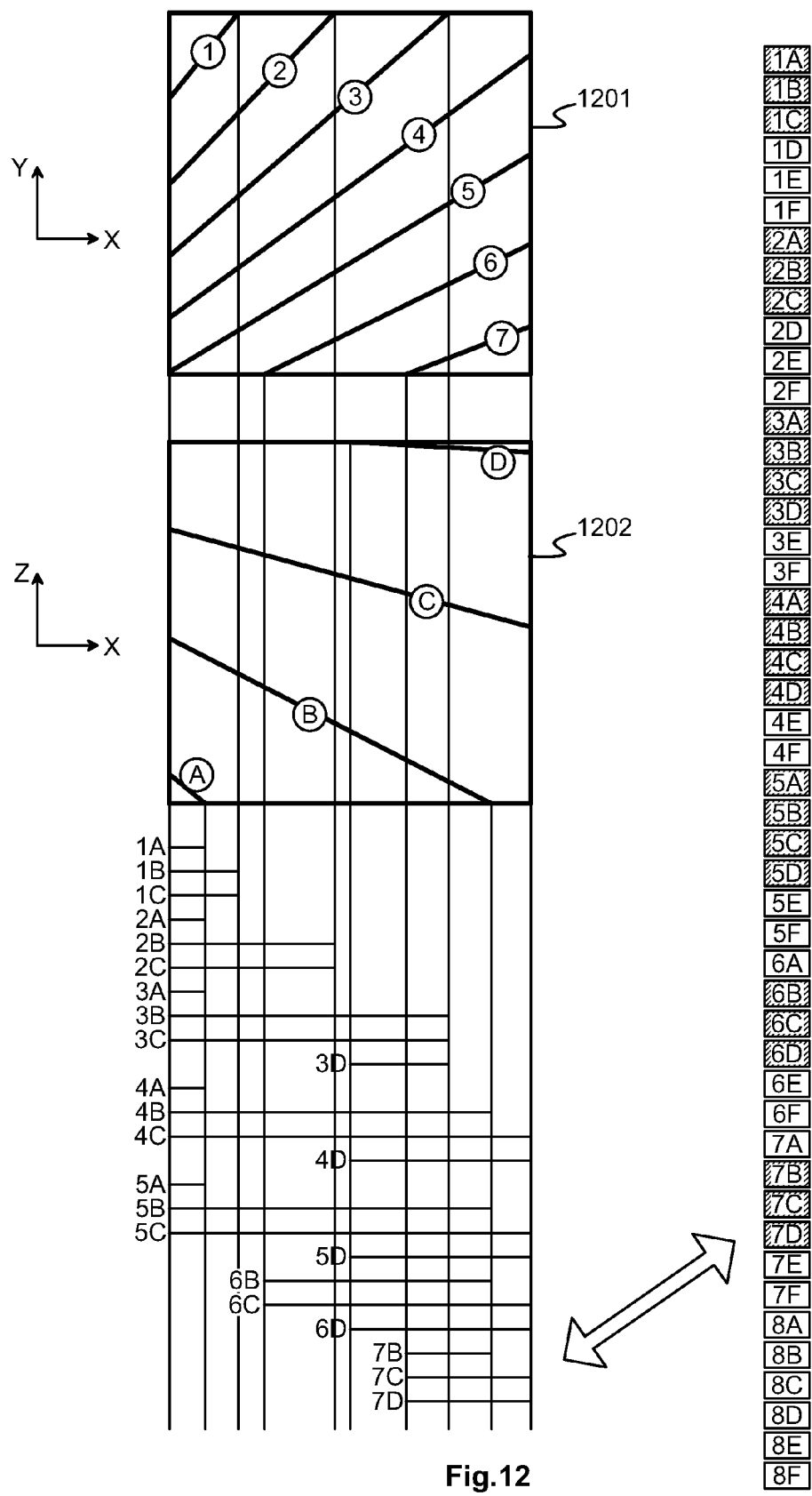
FIG. 12 illustrates the process of finding projection lengths of ray segments.

FIG. 12 is a more detailed illustration of the concept explained above. At the top of FIG. 12 are a top view 1201 and a side view 1202 of an exemplary voxel. Remembering that a line across a face of a voxel represents a fan of rays, one or more of which may go through that voxel, we note that a total of seven different vertical fans of rays are represented in the top view 1201, each as a line numbered from 1 to 7. A total of four different horizontal fans of rays are represented in the side view 1202, each as a line marked from A to D. Since each individual ray only belongs to one vertical fan and one horizontal fan of rays, individual rays can be identified with a number-letter combination in FIG. 12: for example, ray 3B is that ray from the vertical fan represented with line 3 that in the side view appears in the horizontal fan represented with line B.

The lower part of FIG. 12 illustrates the one-dimensional projections of the segments inside the voxel of those rays that actually go through the voxel in question. In other words, the vertical lines in the lower part of FIG. 12 mark positions on the X axis, and each horizontal line extends from the true $x_{in}$ coordinate to the true $x_{out}$ coordinate of one ray that goes through the voxel. For example, in the vertical fan of rays represented with line 1 in the top view 1201, there is one particular ray that simultaneously belongs to the horizontal fan of rays represented with line A in the side view 1202. The projection on the X axis of the segment inside the voxel of that ray has the length illustrated by the horizontal line 1A in the lower part of FIG. 12. The same vertical fan of rays comprises another particular ray that simultaneously belongs to the horizontal fan of rays represented with line B; the projection on the X axis of the segment inside the voxel of that ray has the length illustrated by the horizontal line 1B.

The right part of FIG. 12 shows an example of how the rays could be represented as elements of a theory matrix. Here we assume that there were 48 rays in total, appearing in eight vertical fans 1, . . . ,8 and six horizontal fans A, . . . , F of rays. The part of one complete column of a corresponding theory matrix that corresponds to one projection is shown, with those elements hatched that are non-zero; for example the correspondence of the lengths of the rays 7B, 7C, and 7D and the respective non-zero elements is pointed out. Noting again that the number of rays in a real-life case would be very much larger than 48, we may draw the general conclusion that the non-zero elements of a theory matrix column will appear as a relatively short sequence, all other elements of the column being zero, and even said sequence consists of shorter sub-sequences with intermittent runs of zero-valued elements.

We may systematize the analysis of ray segments inside voxels in the following way. We calculate a two-dimensional table Table_XY, entries of which are indexed with the coordinates column_x and column_y, in the following way:

$$\text{Table\_XY(column\_x,column\_y)} = \{n\text{lines}_{XY}; \text{ for each line } \{x_{in}, x_{out}, \text{pixel\_y}\}\} \quad (2)$$

The variable $n\text{lines}_{XY}$ gives the number of lines (representing fans of rays) appearing on a top face of a voxel. For each line, a sub-entry of three values or a "triplet" appears in the table entry, indicating the x coordinates $x_{in}$ and $x_{out}$ of ray entry and exit points and the ray identifier pixel_y.

Table_XY corresponds to the top view of the grid, as seen for example in FIG. 6. A more detailed illustration of a top view is given in FIG. 13. The grid in FIG. 13 has 3×3 vertical columns of voxels, and the detector has six vertical rows of pixels. A total of nine x-coordinates are given, of which x2, x6, and x8 are column centrepoints (i.e. possible values of column_x) and the rest are points where rays enter or exit voxels. The three y-coordinate values y1, y2, and y3 correspond to column centrepoints (i.e. possible values of column_y), and the pixel_y coordinate values range from PY1 to PY6. The complete Table_XY for the case of FIG. 13 can be shown in text form as follows:

| Table_XY | column_x = x2 | column_x = x6 | column_x = x8 |
|---|---|---|---|
| column_y = y3 | 2<br>{x1, x3, PY6}<br>{x1, x4, PY5} | 1<br>{x4, x7, PY5} | 1<br>{x7, x9, PY5} |
| column_y = y2 | 2<br>{x1, x4, PY4}<br>{x1, x4, PY3} | 2<br>{x4, x7, PY4}<br>{x4, x7, PY3} | 2<br>{x7, x9, PY4}<br>{x7, x9, PY3} |
| column_y = y1 | 2<br>{x1, x4, PY2}<br>{x1, x4, PY1} | 2<br>{x4, x7, PY2}<br>{x4, x5, PY1} | 1<br>{x7, x9, PY2} |

Figure 13:
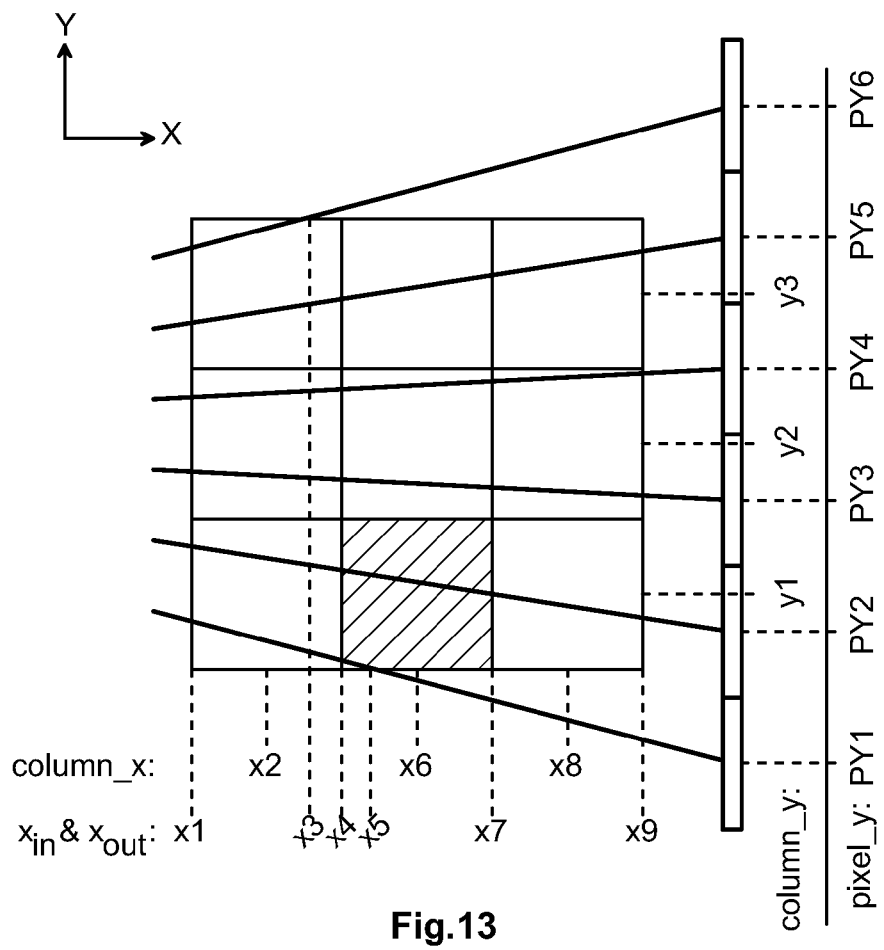
FIG. 13 illustrates the way in which certain table entries are constructed.

The order of the column_x and column_y indices has been selected here so that the cells of the table above are in the same order as the voxels seen in FIG. 13 and easily comparable to them. The hatched voxel and the corresponding emphasized entry in the table will be used for a particular example later.

Similarly we may present a table Table_XZ, entries of which are indexed with the coordinates column_x and column_z, in the following way:

$$\text{Table\_XZ(column\_x,column\_z)} = \{n\text{lines}_{XZ}; \text{ for each line } \{x_{in}, x_{out}, \text{pixel\_z}\}\} \quad (3)$$

The variable $n\text{lines}_{XZ}$ gives the number of lines (representing fans of rays) appearing on a side face of a voxel. For each line, a triplet appears in the table entry, indicating the x coordinates $x_{in}$ and $x_{out}$ of ray exit points and the ray identifier pixel_z. Let us assume that the side view of the hatched voxel is like in FIG. 14, and correspondingly in Table_XZ the entry for this voxel is the following (to save space, only the entry in question is explicitly shown):

| Table_XZ | column_x = x2 | column_x = x6 | column_x = x8 |
|---|---|---|---|
| column_z = z1 | . . . | 2<br>{x4, x7, PZ1}<br>{x6, x7, PZ2} | . . . |
| . . . | . . . | . . . | . . . |

This illustrated way of storing Table_XY and Table_XZ is naturally only an example. Tables typically represent very regular data structures, in which the consecutive order of entries and regular division into consecutive entries can be utilized to find the most practical and economical way of storing. For example, it is not necessary to have the nlines-values stored physically in the same table entry as the triplets; there could well be separate tables for the nlines-values, arranged in the same way as the tables for the triplets, so that one-to-one correspondence between entries in the tables would reveal the appropriate relationships between entries.

The total lengths of rays can be collected to a third table so that $$\text{Table\_line\_lengths(pixel\_y,pixel\_z)} = \{\text{total length of each ray}\} \quad (4)$$

Giving both the y and z coordinates of a pixel in the detector identifies an individual ray. Above we have used the notation pixel_y to mean the y-coordinate of a pixel in general, and any of PY1, PY2, . . . , PY6 to designate individual instances of pixel_y. Similarly pixel_z is a general notation for the z-coordinate of a pixel, so its individual instances could be e.g. PZ1, PZ2, PZ6 in a simplified detector having 6×6 pixels.

Following the principle illustrated above in FIG. 12, comparing the entries in the tables Table_XY and Table_XZ reveals, which rays actually go through some particular voxel: those, for which the X axis projections of segments inside a voxel have at least some overlap. The ultimate maximum number of rays that may go through any voxel is max(nlines$_{XY}$)×max(nlines$_{XZ}$); following our previous assumption that no nlines-values greater than 8 will be encountered, the maximum number of rays going through a particular voxel is 64 at most. The actual maximum number may be smaller, if max(nlines$_{XY}$) is never encountered in a same voxel as max(nlines$_{XZ}$).

Each voxel corresponds to a particular pair of entries in Table_XY and Table_XZ, and each of said entries in turn consists of an nlines value plus as many triplets as the nlines value shows. In order to provide a shorthand notation for referring to the rays going through a voxel, we may construct a new table called Table_true_rays. Each indexed element of it comprises a relative reference pair (triplet # in Table_XY entry, triplet # in Table_XZ entry) that tells, which triplets should be read from a pair of entries in Table_XY and Table_XZ. Additionally each indexed element of Table_true_rays may comprise two flag bits indicating, whether the actual $x_{in}$ and $x_{out}$ coordinate values of the ray in that voxel should be read from Table_XY or Table_XZ. Let us assume that this new table has been constructed and a part of it looks like this:

| Table_true_rays | |
|---|---|
| index in table | element in table |
| 0 | (000,000); 0, 0 |
| 1 | (000,001); 0, 0 |
| ... | ... |
| 9 | (001,000); 0, 0 |
| 10 | (001,001); 0, 0 |
| ... | ... |
| 180 | (110,011); 1, 0 |
| ... | ... |
| 203 | (001,001); 1, 1 |
| ... | ... |

Here the triplet numbers are illustrated with three-bit digital values from 000 to 111. For example the element with index 180, which reads "(110,011); 1, 0" is a shorthand notation for: "take the seventh triplet (i.e. triplet 110) from the Table_XY entry in question and read the pixel_y value from it; take the fourth triplet (i.e. triplet 011) from the Table_XZ entry in question and read the pixel_z value from it; read the $x_{in}$ coordinate value from the Table_XZ triplet; read the $x_{out}$ coordinate value from the Table_XY triplet. Here we assume that flag bit value 0 refers to Table_XY and flag bit value 1 refers to Table_XZ.

For each (nlines$_{XY}$, nlines$_{XZ}$) pair there are four possible flag bit combinations "0, 0"; "0, 1"; "1, 0" and "1, 1". Thus in our max(nlines$_{XY}$)×max(nlines$_{XZ}$)=64 example, Table_true_rays has a maximum of 64×4=256 elements. It may have significantly less, because typically not all (nlines$_{XY}$, nlines$_{XZ}$) pairs are ever encountered, at least not with all flag bit combinations. By taking care that Table_true_rays has elements for only those cases that actually emerge in at least one voxel, it is possible to make its index space (i.e. the maximum index value) significantly smaller than 256.

Figure 14:
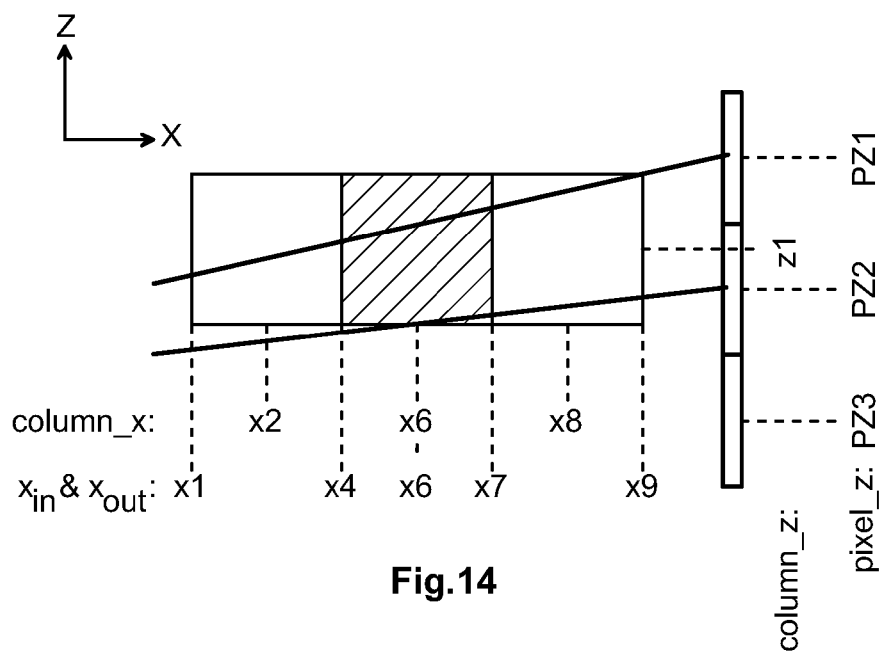
FIG. 14 illustrates a detail of the case of FIG. 13 from the side.

From the emphasized entry in our examples of Table_XY and Table_XZ earlier and from FIGS. 13 and 14 we see that rays that actually go through the hatched voxel (the one with column_x=x6, column_y=y1, column_z=z1) are those identified with (PY2, PZ1), (PY1, PZ1), and (PY2, PZ2). Of these the (PY2, PZ1) and (PY1, PZ1) rays may have their actual $x_{in}$ and $x_{out}$ coordinate values read from Table_XY (=flag bit values 0, 0) and the (PY2, PZ2) ray must have its actual $x_{in}$ and $x_{out}$ coordinate values read from Table_XZ (=flag bit values 1, 1). In order to store the knowledge about which rays go through the hatched voxel and which lengths they have inside the voxel it thus suffices to store the list of indices (0, 9, 203) of Table_true_rays.

It has been found that it is highly probable that the grid contains also other voxels, for which the through-going rays obey exactly the same pattern in Table_true_rays, i.e. that corresponding to indices (0, 9, 203) of Table_true_rays. Similarly there may be other groups of voxels, the through-going rays of which are identified by another common combination of indices of Table_true_rays. We may thus construct yet another table called Table_combination_values, which lists all those index combinations of Table_true_rays that will be encountered:

| Table_combination_values | |
|---|---|
| index in table | element in table |
| ... | ... |
| 2384 | (0, 9, 203) |
| ... | ... |

Now, in order to store the knowledge about which rays go through the hatched voxel and which lengths they have inside the voxel it suffices to store the single index 2384 of Table_combination_values. The index space of Table_combination_values is easily so large that e.g. 2 bytes are needed to express an index value, but on the other hand ensuring that only the actually needed information, i.e. that encountered in actual voxels, is stored in the tables above may allow achieving significant savings in required storage space.

The tables that have been introduced above enable various approaches to storing the theory matrix in compressed form, aspects of which are explained with reference to FIG. 15. The top part of FIG. 15 shows schematically the vector m of measurement results 1501, the theory matrix A with reference number 1502, the vector x of unknowns 1503, and the error vector E with reference number 1504. Due to the way in which the calculations of statistical inversion proceed, of specific interest are the columns of the theory matrix, one of which is schematically shown as 1505. Only relatively few of the elements of the column 1505 are non-zero, which is schematically illustrated with hatching.

As a starting point let us recall that, taken nearest neighborhood interpolation, a matrix element $a_{i,j}$ in the theory matrix gives the length of the segment of the i:th ray within the j:th voxel. If the theory matrix was stored as a whole, i.e. without any compression at all, this unequivocal relation between the indices of the matrix element on one hand and the rays and voxels on the other hand would make it unnecessary to include in the actual content of the matrix element $a_{i,j}$ any explicit announcement of which voxel and which ray it refers to. The same applies not only to nearest neighborhood but also to other methods: when the parametrization of the medium (i.e. the way in which the grid was constructed) and the approach taken to the construction of the theory matrix are known, it may be possible to associate the appropriate ray with the appropriate voxel by only looking at the indices of the theory matrix element.

The column index (the j index) constitutes an unequivocal relationship between an individual voxel of the grid and a pair of entries in the tables Table_XY and Table_XZ. The voxel has three coordinates column_x, column_y, and column_z (see FIGS. 6 and 9), of which the pairs (column_x, column_y) and (column_x, column_z) reveal the appropriate table entries respectively. Simple mathematical formulas can be written that allow drawing the coordinates column_x, column_y, and column_z from the j index; for example in the case of an N×N×N grid with unit-cell sized voxels located in the positive x, y, and z directions from the first voxel at (0, 0, 0) the formulas could be $$\text{column}_x = ((j-1) \bmod N)$$

$$\text{column}_y = ((j-1) \operatorname{div} N) \bmod N$$

$$\text{column}_z = ((j-1) \operatorname{div} N^2) \quad (5)$$

The large size and the sparseness of the theory matrix typically mean that it is more economical to store only the non-zero elements of each column. The lower left part of FIG. 15 illustrates schematically a record 1506, which is an allocated section of memory and contains stored therein the non-zero elements of the column 1505. Only storing the non-zero elements brings about the requirement of somehow indicating the unique row index (the i index) for each non-zero element in the record 1506, i.e. the ray to which said non-zero element is related. The column index (the j index) is common to them all and can be stored as common information of the whole record 1506. The degree of compression that can be achieved depends on how small number of bits is enough to represent each non-zero element in the record 1506.

We consider first storing a non-zero theory matrix element in compressed form as containing a number of fields, as is schematically shown in the lower right part of FIG. 15. Assuming that no voxel of the grid has more than eight (8) fans of rays appearing as lines on its top or side face projection, we can be sure that no column-specific entry in Table_XY or Table_XZ has an value of the "nlines" parameter larger than 8. Consequently no column-specific entry in Table_XY or Table_XZ has more than 8 triplets of the kind $\{x_{in}, x_{out}, \text{pixel\_y}\}$ (in Table_XY) or $\{x_{in}, x_{out}, \text{pixel\_z}\}$ (in Table_XZ). A particular item in a set of eight can be identified with a three-bit identifier value.

The three-bit identifier in the first field 1511 indicates, which triplet (here: triplet "100" or the fifth triplet, if the triplets are numbered from first to eighth in decimal but 000 to 111 in binary) is read from that entry of Table_XY, the indices (column_x, column_y) of which match the x and y coordinates of the voxel in question. The three-bit identifier in the second field 1512 indicates, which triplet (here: triplet "011" or the fourth triplet) is read from that entry of Table_XZ, the indices (column_x, column_z) of which match the x and z coordinates of the voxel in question. The one-bit identifiers in the third and fourth fields 1513 and 1514 indicate, from which of these two triplets come the x coordinates $x_{in}$ and $x_{out}$ respectively that tell the ray entry and exit points: for example, we may assume that the value 0 in field 1513 indicates that an $x_{in}$ coordinate must be read from the triplet read from Table_XY and the value 1 in field 1514 indicates that an $x_{out}$ coordinate must be read from the triplet read from Table_XZ.

The contents of the appropriate triplets, which themselves were identified with the values of the first field 1511 and the second field 1512, can be used to derive the row index (the index) of the element. The value pixel_y in the triplet read from Table_XY and the value pixel_z in the triplet read from Table_XZ together identify a pixel in the detector, which in this context is synonymous to identifying a ray, which in turn is synonymous to identifying the row index (the i index) of the element.

In some cases it is more advantageous to nevertheless have an explicit indication of the row index (the i index) stored as a part of the content of the element. The requirements of storage space must be weighed against the requirements of computing operations: the more time would be consumed by the operations needed to retrieve the row index from indirect sources, the more acceptable the additional need of storage space. FIG. 15 illustrates an optional fifth field 1515 for storing an explicit indication of the row index (the i index) of the element. Remembering that the row index is essentially the identifier of the ray, and assuming a 1000×1000 pixels detector, storing the ordinal number of the corresponding pixel as a ray identifier would necessitate a minimum of 20 bits per viewing angle. Thus for many applications the additional consumption of storage space caused by this practice would be hard to justify.

Additional compression and consequent savings in memory requirements can be achieved with the table Table_true_rays. A non-zero theory matrix element can be stored in compressed form in the record 1506 in the form of a single field 1521, which comprises an index value to Table_true_rays Above we concluded that the index space of Table_true_rays is typically at least not larger than 256, which means that the field 1521 would not need to be longer than 8 bits. Since Table_true_rays only contains an element for each actually encountered case, its index space may be smaller and the field 1521 can be correspondingly shorter.

More compression can be added by using Table_combination_values. As a representative of the first non-zero element of the j:th column—i.e. as the first element stored in the record 1506—one may store an index to Table_combination_values, illustrated as field 1531. This is then the only element that actually needs to be stored in the record 1506; in other words, the field 1531 becomes equal to the record 1506. The index space of Table_combination_values is necessarily larger than that of Table_true_rays, and consequently the field 1531 is correspondingly longer, but if e.g. a typical record 1506 would otherwise have six elements of one byte each (for storing six 8-bit index values to Table_true_rays) or even more, storing instead an e.g. 16-bit index to Table_combination_values in field 1531 still creates additional savings at least by the factor three.

Yet another possible approach to storing the theory matrix in compressed form is not to store the non-zero theory matrix elements permanently at all, but to store only the auxiliary tables Table_XY and Table_XZ. Each time when the value of a non-zero theory matrix element is needed, it can be calculated again "on the fly" from the appropriate entries in Table_XY and Table_XZ.

Uncompressing a compressed theory matrix element like that shown in FIG. 15, i.e. finding out the actual value of the matrix element $a_{i,j}$, may necessitate as little as one subtraction and one multiplication, and takes place according to the following steps:

using the index j of the theory matrix element to identify the appropriate voxel, i.e. the coordinates column_x, column_y, and column_z that reveal the appropriate entries in Table_XY and Table_XZ, identifying the ray that corresponds to the compressed theory matrix element, and reading its length (or a scaling factor proportional to its length) from Table_line_lengths, using the three-bit identifiers in fields 1501 and 1502 (or those read from an element in Table_true_rays) to identify the appropriate triplets in said entries in Table_XY and Table_XZ, using the one-bit identifiers in fields 1503 and 1504 (or those read from an element in Table_true_rays) to identify, from which of said triplets come the x coordinates $x_{in}$ and $x_{out}$ respectively, calculating the difference $|x_{out}-x_{in}|$, i.e. the length of the ray segment inside the voxel, and scaling the calculated difference with the length of the ray or with said scaling factor.

Depending on whether an explicit indication of the row index (the index) has been stored as a part of the contents of the element, the step of identifying the ray that corresponds to the compressed theory matrix element may comprise some of the following:

retrieving the row index (the i index) that the element would have in the uncompressed theory matrix by reading an indication thereof from a dedicated field in the element; or using the column index (the j index) of the theory matrix element to identify the coordinates column_x, column_y, and column_z that reveal the appropriate entries in Table_XY and Table_XZ, using the three-bit identifiers in fields 1501 and 1502 (or those read from an element in Table_true_rays) to identify the appropriate triplets in said entries in Table_XY and Table_XZ, retrieving the pixel_y and pixel_z values from said triplets, and using them to identify the ray.

If the earlier explained practice of storing an index to Table_combination_values in the first element of the record 1506 has been employed, the step of identifying the ray that corresponds to the compressed theory matrix element may comprise one of the following:

for the first element of the record (i.e. the first non-zero element of the column 1505 of the uncompressed theory matrix 1502), reading the index to Table_combination_values from the element, reading the corresponding list of ray identifiers from the appropriate entry in Table_combination_values, and selecting the first ray identifier, or for the second, third, etc. element of the record, reading the index to Table_combination_values from the first element, reading the corresponding list of ray identifiers from the appropriate entry in Table_combination_values, and selecting the second, third, etc. ray identifier respectively.

If we employed the practice of only storing the auxiliary tables Table_XY and Table_XZ, and not explicitly storing any non-zero values of the theory matrix at all, uncompressing a theory matrix element could comprise the following steps:

using the index j of the theory matrix element to be uncompressed to identify the appropriate voxel, i.e. the coordinates column_x, column_y, and column_z that reveal the appropriate entries in Table_XY and Table_XZ, identifying the ray that corresponds to the compressed theory matrix element, and reading its length (or a scaling factor proportional to its length) from Table_line_lengths, cross-correlating the $x_{in}$ and $x_{out}$ values read from those triplets in said entries that relate to the identified ray, deducing the endpoints of the $x_{in}$-to-$x_{out}$ overlap, and calculating the difference $|x_{out}-x_{in}|$ that indicates the length of the ray segment inside the voxel, and scaling the calculated length of the ray segment with the length of the ray or with the scaling factor.

FIG. 16 illustrates an example of how the matrix equation shown at the top of FIG. 15 can be constructed when there are multiple (in this example: three) viewing angles. The vector m that contains the measurement results consists of concatenated component vectors $m_1$, $m_2$, and $m_3$, which contain the measurement results of the first, second, and third viewing angle respectively. The error term $\epsilon$ consists of corresponding concatenated component error vectors $\epsilon_1$, $\epsilon_2$, and $\epsilon_3$. The vector x of unknowns stays the same, because the target region and its parametrization (i.e. the grid) are the same for all viewing angles. The theory matrix A consists of the component matrices $A_1$, $A_2$, and $A_3$ stacked on top of each other, each component matrix corresponding to one viewing angle.

The rays of the ray model go through the voxels differently in each viewing angle, which means that the information that has been described above as being stored in Table_XY, Table_XZ, and Table_line_lengths, must in the general case be determined separately for each viewing angle (Table_true_rays, and Table_combination_values may be the same for all viewing angles; adding more viewing angles may increase the number of actually occurring cases, which in turn "fills up" or increases the number of entries in Table_true_rays and/or Table_combination_values). This has an effect on how the theory matrix is compressed and uncompressed, because a theory matrix column 1601 may contain non-zero elements, the compression and uncompression of which relies on several different versions of said tables. For example, if the compressed non-zero elements of the column 1601 are stored in a single record (see record 1506 in FIG. 15), the compressed form of the first non-zero element of each viewing angle may contain a viewing angle indicator, so that the uncompressing routine knows to use the correct tables. Alternatively or additionally the compressed non-zero elements belonging to different viewing angles may be separated from each other with some kind of dummy separator elements in the record, and/or the number of compressed non-zero elements associated with each viewing angle in the column 1601 may be stored separately. Yet another possibility is to have separate records for the compressed non-zero elements of each viewing angle.

The compression approach that has been described above, namely the one based on tables like Table_XY, Table_XZ, Table_line_lengths, Table_true_rays, and Table_combination_values can be described as a "lossless" compression approach, because despite the compression it allows calculating the appropriate theory matrix element values for each and every voxel of the grid at the numerical accuracy that has been selected for representing the $x_{in}$ and $x_{out}$ coordinates as floating point values.

Lossy Compression Approach

As an alternative approach to compressing the theory matrix we consider the use of a "voxel library". This alternative approach is generally designated as "lossy", because by nature it involves the use of a discrete set of voxel models, which means that there are a number of voxels that will not be considered exactly as they are but approximated with the closest possible voxel model.

Figure 17:
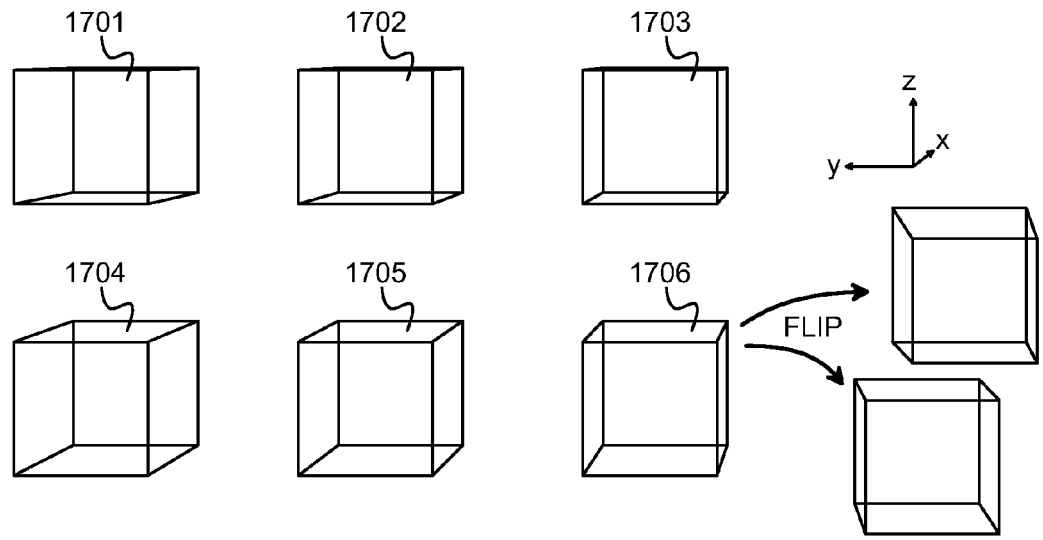
FIG. 17 illustrates examples of voxel models in a voxel library.

We may begin by again considering a regular grid of cubic voxels, the sides of which are oriented along the X-, Y-, and Z-axes; this is no requirement of the approach, but serves to provide an illustrative explanation. FIG. 17 illustrates schematically a number of voxels as seen from the direction of the radiation source. The voxels 1701, 1702, 1703, 1704, 1705, and 1706 are all at the same distance from the radiation source, which means that their front faces appear equal in size. They all have voxel-specific (y,z) coordinate pairs, which differ from those of the radiation source. This means that they are located at various horizontal and vertical distances from the central line of the conical X-ray beam—we may say that the voxels seen in FIG. 17 have different rotations.

A set of voxel models with different rotations, like those in FIG. 17, and with different distances (i.e. different x coordinates) and different perspective projections, constitutes a voxel library. Each voxel in the grid can be approximated with that voxel model in the library that most closely matches the voxel to be approximated. In selecting the voxel models for the library it should be noted that symmetric reproductions of voxels need not be included separately in the library, if approximating a voxel can involve taking a mirror image of (or "flipping"; horizontally and/or vertically) a voxel model, as is shown in the lower right part of FIG. 17. Scaling, on the other hand, is not as straightforward, because a voxel that is at a different x-direction distance from the radiation source is not only seen as differently sized, but also as having a different perspective projection. Scaling may also be unproductive in terms of required calculation resources. For this reason the voxel library may contain voxel models representing voxels at different x-direction distances.

A particular voxel model in the voxel library can be identified with a set of parameter values. Examples of such parameters include—but are not limited to—the following:
  angle XY in which a ray passing through a known point of the voxel model hits the detector,
  angle Z (or XZ) in which said ray hits the detector,
  angle XY in which a ray passing through a known point of the voxel model hits the voxel,
  angle Z (or XZ) in which said ray hits the voxel,
  zoom factor, i.e. distance from radiation source to voxel vs. some fixed distance, like the distance from source to detector,
  perspective factor, i.e. distance from radiation source to voxel.

If the geometry is such where the radiation source is always on the X axis (whereas the grid may have some rotation), the distances used to define the zoom factor and the perspective factor can be replaced with the X axis projections of the same.

In general there a numerous possible ways of defining the identification parameters, and any such way can be used that allows identifying the voxel models unambiguously and with reasonable requirements of memory space. How many different parameters are needed may depend on the selected geometry. For example, if the detector is in the YZ plane and the columns of the grid are parallel with the Z axis, the two "angle Z" or "angle XZ" parameters mentioned above are always equal, so only one of them is needed. If additionally the grid has zero rotation, i.e. the horizontal rows of the grid are oriented along the X and Y axes, the two "angle XY" parameters mentioned above are always equal, so only one of them is needed.

How much inaccuracy or "information loss" is introduced by not describing each and every voxel as such but approximating it with (a possibly flipped version of) a voxel model in the library depends on the number of voxel models included in the library. As a theoretical limiting case there may be as many voxel models in the library as there are different rotations and x-direction distances of voxels (excluding exact similarities obtained through flipping), in which case no inaccuracy at all would be introduced. The number of voxel models in the library should be selected by balancing desired compression efficiency with allowable introduced inaccuracy.

Figure 18:
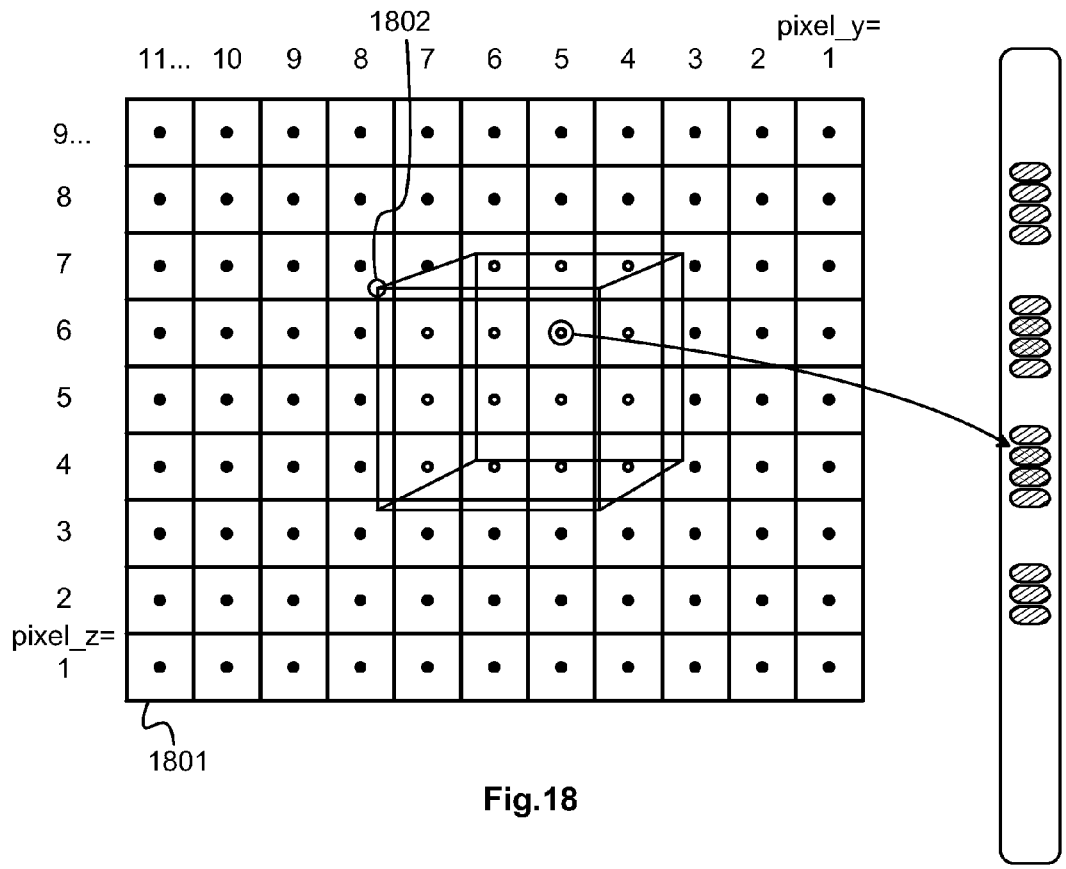
FIG. 18 illustrates certain rays that go through a voxel model.

FIG. 18 illustrates how a voxel model corresponds to non-zero elements in a column of a theory matrix. The background of FIG. 18 is a two-dimensional pixelized radiation detector 1801 parallel to the yz plane, so that the pixels have coordinates pixel_y=1, 2, 3, . . . and pixel_z=1, 2, 3, . . . respectively. The dot at the centre of each pixel illustrates a ray similarly as in e.g. FIG. 4; in FIG. 18 the view is from the radiation source so each ray is only seen along its own direction. One voxel is considered, and represented with a voxel model taken from a voxel library. The exact location of that voxel in relation to the radiation source and the detector is known from the x-, y-, and z-coordinates of them all, so the voxel model can be made to appear at the appropriate location; for example, the upper left corner 1802 of the front face of the voxel can be used as a "location corner" or an indicator of the location.

We see that 15 rays, shown as white dots, pass through the voxel represented with the voxel model on their way from the radiation source to the detector 1801, so in that column of the theory matrix that corresponds to this voxel there will be 15 non-zero elements. The illustration on the right in FIG. 18 assumes that the row indices (the i indices) in the theory matrix have been selected to correspond to the rays in a first-horizontal-then-vertical increasing order of pixel_y and pixel_z. As a consequence the non-zero element that corresponds to the ray at (pixel_y=5, pixel_z=6) appears as the second one in the third group of consecutive non-zero elements.

Several approaches are possible for calculating the values of the non-zero elements in the column of the theory matrix, depending on the form in which the voxel models are stored.

Figure 19:
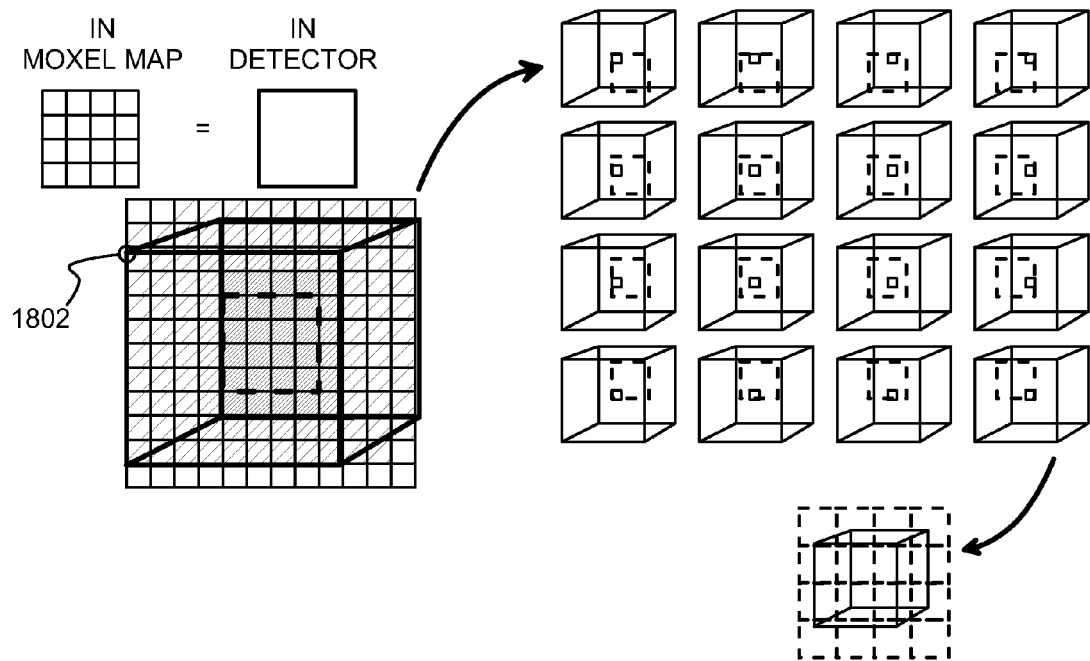
FIG. 19 illustrates an example of shifted voxel models.

FIG. 19 illustrates first a principle of storing a voxel model in the form of a map. In order not to confuse with the pixels of the detector, we introduce the concept "moxel", meaning "model pixel". To increase accuracy we assume that 4×4 moxels in the moxel map correspond to one pixel in the detector in a 16:1 relation. This selection is an example only, and some other relation (smaller or larger) between moxels in the moxel map and pixels in the detector could be used. Also the number of moxels used in the moxel map may be different than illustrated: for example the moxel map of a voxel model could have 13×13 moxels, or 40×40 moxels, or some other number of moxels in total (instead of the 12×12 moxels of FIG. 19). The value associated with each moxel in the moxel map is indicative of the length that a ray would have inside the voxel of the voxel model if the ray coincided exactly with that moxel in the angular coordinate system (i.e. if the dot representing the ray—see FIG. 18—would hit the centre of that moxel). A coarse illustration of values of moxels in the moxel map is provided in FIG. 19 with the different densities of the hatching.

The right-hand part of FIG. 19 illustrates using "oversampling" by the moxels-to-pixel ratio (16:1 in FIG. 19) to create an expanded set of voxel models. The voxel models so created may be called "offset images". They have the common form (i.e. same rotation and same scale), but they represent different offsets in the relation between the moxel map and the detector pixels behind it. In the right-hand part of FIG. 19 this is illustrated so that an imaginary detector pixel in the background, shown as a dashed square, stays the same. Each offset image is marked with the outline of the cubical voxel, and its center moxel is illustrated with the small square. Each offset image has a different offset in relation to the detector pixel, so the center moxel appears at a different position inside the dashed square.

We may assume that the "generic" voxel model, i.e. that on the left in FIG. 19, corresponds to an imaginary case where one detector pixel (that illustrated with the dashed square) is exactly aligned, i.e. right behind the center of the voxel model. If the ray corresponding to that pixel would be illustrated in FIG. 19, it would go exactly through the center point of the voxel model. In real cases the actual location of the voxel to be considered makes the voxel model appear non-aligned, so that the ray goes through some other point than the center point. That offset image on the right in FIG. 19 is then selected in which the center moxel matches best the point through which the ray goes.

Some error still remains, because—even in the selected offset image—the ray seldom goes centrally through the center moxel. This error can be made arbitrarily small by increasing the oversampling, but at the cost of increasing memory requirements. Balancing between memory requirements and calculating capacity requirements can involve selecting how much of the required calculations are made in advance and how much of it is made on the fly, at the time of decompressing a column of the theory matrix. As an example of calculations that could be made on the fly, if sufficient calculating power is available, is calculating the offset images on the fly rather than storing them in advance.

Since the generation of the offset images already reaps the advantages of increased spatial accuracy that come from oversampling, each offset image only needs to be stored at the resolution of detector-pixel-sized units. In other words, an offset image may be "downsampled" from the moxel-level accuracy to the pixel-level accuracy, which is illustrated in the lowest right-hand part of FIG. 19 for one offset image. During downsampling the value for each pixel-sized unit of the offset image can be calculated for example as the mean value of all moxels that fall into that pixel-sized unit in that offset image. Also other ways for calculating the downsampled values can be used.

An example of a memory requirement constituted by a single voxel model and its offset images in the voxel library is as follows.

```
struct{
float* values; // Actual values, size: 0 .. pixel_nx*pixel_ny - 1
intpixel_nx // how many pixel-sized units this voxel model has in the
x direction
intpixel_ny // how many pixel-sized units this voxel model has in the
y direction
intcenter_x; // offset in x direction from the generic voxel model
intcenter_y; // offset in y direction from the generic voxel model
}Downsampled_voxel_model_offset_image;
struct{
Downsampled_voxel_model_offset_image*offset_images;    //
Different offset images with info, size: 0 ..oversampling*oversampling - 1
} Voxel_model_image.
```

An example of what needs to be stored to memory to get a desired part of the theory matrix uncompressed is as follows.

```
struct{
    intimage_index; /// Index of the generic voxel model
    intimage_offset; /// What moxel or offset index;
    intpixel_hit_index_y; /// What pixel does the voxel center hit in y
    direction
    intpixel_hit_index_z; /// What pixel does the voxel center hit in z
    direction
    }Voxel_model_theory;
```

Structures of two first-mentioned kind (i.e. Voxel_model_image and Downsampled_voxel_model_offset_image) are generic for the whole calculation, and they need to be stored only once. Additionally we store one Voxel_model_theoryper gridpoint per projection. Take one.

Assume that we have image index of 100, then we seek from the voxel library the corresponding generic voxel model and corresponding offset image. Now we have found our "Downsampled_voxel_model_offset_image".

Then we simply sum-up the 2D image (i.e. the values of the pixel-sized units of the selected offset image) from the (downsampled)offset image to detector. Speaking in terms that refer directly to the theory matrix, we fill the j:th column with values at indices i that can be calculated with:

```
i = matrix_pixel_index_calc(proj_id, pixel_hit_index_x +
center_x + loop_x, pixel_hit_index_y + center_y + loop_y )
A[i,j] = downsampled_image.values[ loop_x, loop_y ];loop_x
goes from 0 to downsampled_image.pixel_nx - 1; and loop_y
goes from 0 to downsampled_image.pixel_ny - 1.
```

That is: we can store rectangular images to avoid storing the pixel indices. Usually matrix_pixel_index_calc(proj_id, x,y) is for example proj_id*pixel_nx*pixel_ny+y*pixel_nx+x.

The integers at "Voxel_model_theory" can be arbitrarily sized, but to save memory as small as possible integer size should be picked. The smallest possible integer size depends on case-specific parameters. For example if we use oversampling with factor of 11, then we can store the offset image index in 8 bits, but if we use oversampling with factor larger than 16, then we need more than 8 bits. The number of bits needed to store the pixel index information on the other hand depends on the number of projections used and detector resolution. For example if we need 24 bits for image_index, 8 bits for image_offset and 16 bits for both pixel_hit_index_y and pixel_hit_index_z, that means that we will need a total of 64 bits or 8 bytes per projection for a full theory matrix column. The three last-mentioned variables can also be calculated on the fly, resulting in further memory savings, if calculating capacity requirements can be correspondingly increased.

Now consider memory saving: assume that a voxel image would be 8×8 pixels in detector in single projection. We need to store 64×float32 values and 64×uint32 integers that tell to which pixels the values correspond. This means yielding 512 bytes, giving compression factor of 64. To achieve the most effective compression factor we should also consider the amount of memory we are using with the voxel library, but as we can adjust that based on our needs, it may not be that relevant.

We may note that if the grid is located completely symmetrically around the mean direction of the radiation beam—thus allowing maximal utilization of horizontal and vertical flipping of voxel models—a voxel library of 1024 different voxel models contains accurate and unique descriptions of 4096 voxels that have the same x coordinate but different rotations. Such a collection of voxel models covers e.g. more than every tenth voxel in both horizontal and vertical directions in one vertical plane of a 512×512×512 voxel grid; in other words it is already a relatively representative library.

Figure 20:
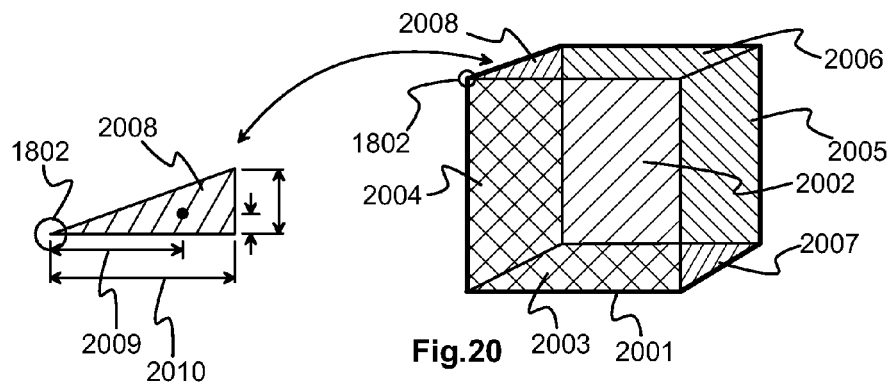
FIG. 20 illustrates another example of storing a voxel model.

An alternative approach to storing the voxel model utilizes the same concept of $x_{in}$ and $x_{out}$ coordinates of rays that was considered earlier in association with the lossless compression approach. FIG. 20 illustrates how the generally hexagonal outline 2001 covered by the voxel model consists of tri- or quadrangular regions. Rays that pass through region 2002 have their $x_{in}$ and $x_{out}$ coordinates at the front and back faces of the voxel respectively, so the corresponding values in the column of the theory matrix are simply the full x-direction length of the voxel scaled with the length of each respective ray. These elements are shown cross-hatched in the schematic illustration on the right in FIG. 18. Rays that pass through region 2003 or region 2004 have their $x_{in}$ coordinate at the front face but their $x_{out}$ coordinate on a side face, while those rays that pass through region 2005 or 2006 have their $x_{in}$ coordinate on a side face but their $x_{out}$ coordinate on the back face. Rays that pass through regions 2007 or 2008 have both their $x_{in}$ and $x_{out}$ coordinates on side faces.

An $x_{in}$ or $x_{out}$ coordinate that is on a side face has a value that can be calculated in a straightforward manner from the angular distance between the ray direction and the directions defined by the corners of the voxel model. These angular distances have been illustrated with arrows in the left part of FIG. 20. For example arrow 2009 illustrates the angular distance between the "location corner" 1802 and a ray to be considered, while arrow 2010 illustrates the angular distance between the "location corner" 1802 and the vertical side of region 2008. The $x_{out}$ coordinate of the illustrated ray is calculated from the x coordinate of the voxel's front face by adding as large a fraction of the voxel's length in the x direction as the angle represented by arrow 2009 is from the angle represented by arrow 2010. The $x_{in}$ coordinate of the illustrated ray is calculated in a similar manner using the angular distances illustrated with the vertical arrows.

In most grids the voxels have a standard length in the x direction, in which case the x coordinate of the voxel and the angles that characterize the direction of its "location corner" and the direction of the ray are all that is needed in the calculation of the values of $x_{in}$ and/or $x_{out}$ coordinates that are on side faces. Here we assume that the geometry and the orientation of the grid in relation to the coordinate axes is the same as that described above in the case of lossless compression.

A voxel model based on regions, like that in FIG. 20, can be stored by storing the angular coordinates of all the endpoints of the sides of the regions in a predetermined order. There are ten endpoints, so if two 32-bit floating point numbers are used to store each endpoint, storing the whole voxel model takes only 640 bits or 80 bytes. The economical form of storing the voxel model means, however, that in the uncompressing phase (i.e. when the actual values of the elements of the uncompressed theory matrix are to be found out), relatively many computational operations are needed.

So far the explanation of the lossy compression method has assumed the use of line integrals with nearest neighborhood interpolation as the method for constructing the theory matrix. However, it can be shown that the same principle applies regardless of the method. In each case, a "shadow image" of a voxel at the detector can be considered; the form of and intensity distribution across the shadow is determined by the method. For example, selecting trilinear interpolation with line length gives a shadow image that is not as sharp-angled as that described in FIGS. 17 and 18, but nevertheless gives a well-defined, location-bound distribution that can be approximated with the closest match selected from a library of alternative distributions or voxel models.

From the facts explained above with reference to FIGS. 17 to 19 we may conclude that when a particular voxel is considered, both the location (i.e. the i index) and the value of each non-zero element in a corresponding column of a theory matrix can be determined if the following are known:

the x coordinate of the voxel in question,
the angular location of a "location corner" or other fixed point that represents the angular location of the voxel, and
a sufficient number of voxel models that constitute a voxel library.

The angular location of the voxel can be considered to consist of two angular coordinates rot_y and rot_z, which are the horizontal (rot_y) and vertical (rot_z) angular differences between the direction in which the "location corner" or other fixed point of the voxel appears from the radiation source and the central direction (that parallel to the X axis) of the radiation beam. The absolute values of rot_y and rot_ztell, which voxel model in the library provides the closest match with the rotation of the voxel in question, and the signs of rot_y and rot_z define the possible need for flipping the voxel model. Together the x coordinate and the angular location define the scaling ratios that are needed for calculating possible $x_{in}$ and/or $x_{out}$ coordinates that are on a side face.

Transformation of Geometries

The methods for compressing and decompressing the theory matrix that have been described above, especially the ones associated with the term lossless compression, have included an assumption of a basic-case geometry, in which the detector is planar and oriented along an yz-plane (i.e. a constant-x plane) of the same rectangular Cartesian coordinate system in which the voxels of the grid are oriented in vertical and horizontal columns. These are not restrictive requirements of the invention, because many other geometries can be returned to the basic case by using relatively straightforward transformations. Concerning lossy compression, the assumptions are easier already to start with: it is only assumed that vertical columns of voxels in the grid, as well as those of the pixels in the detector, are oriented in the z direction and the detector faces the radiation source perpendicularly. Even of these the last-mentioned can be released by noting how a simple transformation of geometries allows the use of an "imaginary" perpendicular detector.

Figure 21:
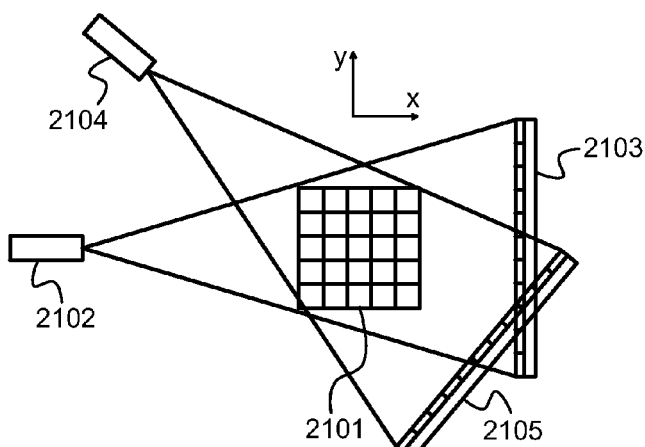
FIG. 21 illustrates an exemplary geometry of two viewing angles.

FIG. 21 illustrates an example, in which computerized tomography is made of a target region that is parameterized with a grid 2101. A radiation source and a detector are placed on opposite sides of the target medium. One of the irradiation angles is such where the mean direction of the radiation beam, i.e. the imaginary perpendicular line from the radiation source to the centre of the detector, is parallel to the X axis, so the conditions of the basic-case geometry mentioned above are fulfilled. This irradiation angle is illustrated with the radiation source at 2102 and the detector at 2103. Many computerized tomography appliances rotate the radiation source and the detector in synchronism around a common axis of rotation, which may bring the radiation source and the detector to the rotated position shown with the radiation source at 2104 and the detector at 2105. In this case the assumption about the detector being oriented along an yz-plane is not valid anymore.

Figure 22:
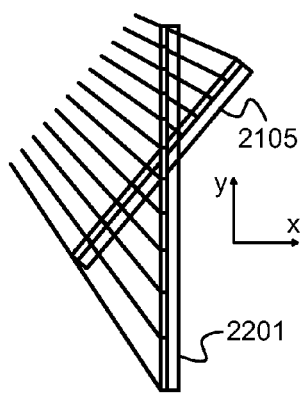
FIG. 22 illustrates a geometry transform.

FIG. 22 illustrates a coordinate transform that can be used to return the rotated geometry to the basic case. Instead of the actual pixels of the rotated detector 2105 we consider the fictitious pixels of a fictitious straightened detector 2201. The angular coordinates of these fictitious pixels in the horizontal direction (i.e. in the plane of the paper surface in FIG. 22) are exactly the same as those of the actual pixels of the rotated detector 2105, as can be seen in FIG. 22. Their angular coordinates in the vertical direction only need to be corrected with a linear correction function that has the rotation angle of the detector as a parameter.

A similar correction can be applied if the detector is not planar: a fictitious planar detector is considered instead, and the necessary correction functions are constructed that implement the mapping between the actual pixels of the non-planar detector and the fictitious pixels of the fictitious planar detector. Constructing the correction functions is a process straightforward as such for anyone who is familiar with transforms between Euclidean coordinate systems.

Using the Columns of the Theory Matrix

A quantity that needs to repeatedly considered during the reconstruction of an image through statistical inversion is $$A_j^T(Ax) \quad (6)$$

where A is the theory matrix, $A_j^T$ is the transpose of the j:th column of the theory matrix, and x is the vector-valued variable, the components of which represent the voxel-specific unknowns. The whole theory matrix is, however, not needed at once, even if Ax appears in the expression (5), because every time when a new value has been drawn for the j:th component of the vector-valued variable x, the updated value of Ax can be calculated as $$(Ax)_{updated} = (Ax)_{old} + A_j(x_{new} - x_{old}) \quad (7)$$

where $x_{new}$ is the vector-valued variable x with the newly drawn value of its j:th component, and $x_{old}$ is correspondingly the vector-valued variable x with the previous (old) value of its j:th component.

Expressions (6) and (7) show that when a theory matrix has been stored in compressed form, only one column of it (i.e. only $A_j$) needs to be decompressed at a time. This has two important implications:

the available memory does not need to be large enough to hold the whole uncompressed theory matrix; it suffices to have enough memory to hold the data structures required to maintain the compressed form of the theory matrix plus the uncompressed form of one of its columns at a time, and the compression method must be such that in order to decompress one column of the theory matrix it is not necessary to decompress much more of the theory matrix; optimally it should be possible to decompress one column independently of any other columns of the compressed theory matrix.

Both the lossless and lossy compression approaches described earlier fulfill the last-mentioned criterion. They consider one voxel at a time, and since there is one-to-one correspondence between the voxels of the grid and the columns of the theory matrix, the criterion is fulfilled. Once used, the uncompressed form of the column that was in turn can be discarded to free memory space for the uncompressed form of the next column.

What is claimed is:

1. A method for producing an electronic representation of an image of a target region through statistical inversion, comprising:
   mapping the target region with a grid, and describing a number of voxels in the grid with voxel-specific unknowns,
   representing said unknowns with components of a vector-valued variable,
   repeatedly generating a next version of said vector-valued variable by drawing for each component a value from a conditional distribution, and
   using the components of a so generated version of said vector-valued variable as said electronic representation;
   wherein:
   a theory matrix, elements of which indicate, what is the contribution of each voxel in the grid to a detection result obtained at a particular pixel of a detector, is stored in a compressed form, and
   only a subset of the theory matrix is decompressed from said compressed form for at least one of the following:
     updating the quantity Ax, where A is the theory matrix and x is the vector-valued variable, after said generating of a next version of said vector-valued variable,
     calculating the quantity $A_j^T(Ax)$, where A is the theory matrix, $A_j^T$ is the transpose of the j:th column of the theory matrix, and x is the vector-valued variable
   and for decompressing a column of elements of the theory matrix, which column corresponds to a voxel of the grid, the method comprises:
   using two perpendicular projections of said voxel and of the rays of a ray model to identify one or more rays that go through the voxel and to find the points at which said one or more rays penetrate the sides of the voxel, and
   calculating uncompressed values of said elements by scaling the projected length of each section of said one or more rays that falls within said voxel with a scaling factor proportional to the whole length of the respective ray; wherein:
   said using of two perpendicular projections of said voxel and of said rays of the ray model comprises:
   using coordinates of said voxel to identify a first entry in a first table and a second entry in a second table, wherein each of said first entry and said second entry comprises one or more ray-specific records, and wherein each of said ray-specific records comprises a ray-specific entry point coordinate and a ray-specific exit point coordinate,
   identifying those rays as going through the voxel for which the range between ray-specific entry and exit point coordinates comprised in said first entry has a non-empty intersection with the range between ray-specific entry and exit point coordinates comprised in said second entry, and
   using the ray-specific entry and exit point coordinates of the endpoints of said non-empty intersection to indicate points at which the corresponding ray penetrates the sides of the voxel.

2. A method according to claim 1, wherein said projected lengths of each section of said one or more rays that falls within said voxel are the differences between said ray-specific entry and exit point coordinates of the end points of said non-empty intersection.

3. A method according to claim 2, wherein said scaling factor proportional to the whole length of the respective ray is equal to the whole length of the respective ray.

4. A method according to claim 1, wherein:
   the compressed form of the theory matrix comprises a column-specific record for each column that has non-zero elements in the theory matrix,
   the column-specific record comprises an element-specific entry for each non-zero element of that column in the theory matrix,
   said element-specific entry comprises: a first field, a value of which identifies a ray-specific record in said first entry of said first table; a second field, a value of which identifies a ray-specific record in said second entry of said second table; a third field, a value of which indicates, from which of said first and second entries said ray-specific entry point coordinate is to be read; and a fourth field, a value of which indicates, from which of said first and second entries said ray-specific exit point coordinate is to be read.

5. A method according to claim 4, wherein:
each of said element-specific entries comprises a ray identifier, indicating which ray of the ray model that element corresponds to, and
said ray identifier is an index to a table that lists such rays of the ray model that actually go through at least one voxel of the grid.

6. A method according to claim 5, wherein said scaling factor proportional to the whole length of the respective ray is equal to the whole length of the respective ray.

7. A method according to claim 4, wherein:
a first element-specific entry in said column-specific record comprises a ray combination identifier, identifying a ray combination in a table that lists combinations of rays of the ray model that actually go through at least one voxel of the grid, and
the rays listed in said ray combination are rays of the ray model that correspond to other element-specific entries in said column-specific record.

8. A method according to claim 4, wherein said scaling factor proportional to the whole length of the respective ray is equal to the whole length of the respective ray.

9. A method according to claim 1, wherein said scaling factor proportional to the whole length of the respective ray is equal to the whole length of the respective ray.

10. An arrangement for producing a tomographic reconstruction of a target region through statistical inversion, comprising:
an image storage configured to store voxel-specific values of voxels of a grid that maps a target region, and
a statistical inversion calculator configured to represent initially unknown values of said voxel-specific values with components of a vector-valued variable, and to repeatedly generate a next version of said vector-valued variable by drawing for each component a value from a conditional distribution; and
using the components of a so generated version of said vector-valued variable;
wherein:
the statistical inversion calculator is configured to store a theory matrix, elements of which indicate, what is the contribution of each voxel in the grid to a detection result obtained at a particular pixel of a detector, in a compressed form, and
the statistical inversion calculator is configured to decompress only a subset of the elements of the theory matrix from said compressed form for updating the quantity Ax, where A is the theory matrix and x is the vector-valued variable, after said generating of a next version of said vector-valued variable and calculating the quantity A jT (Ax), where A is the theory matrix, A jT is the transpose of the j:th column of the theory matrix, and x is the vector-valued variable;
and for decompressing a column of elements of the theory matrix, which column corresponds to a voxel of the grid, the statistical inversion calculator is configured:
to use two perpendicular projections of said voxel and of the rays of a ray model to identify one or more rays that go through the voxel and to find the points at which said one or more rays penetrate the sides of the voxel, and
to calculate uncompressed values of said elements by scaling the projected length of each section of said one or more rays that falls within said voxel with a scaling factor proportional to the whole length of the respective ray; wherein:
said using of two perpendicular projections of said voxel and of said rays of the ray model comprises:
using coordinates of said voxel to identify a first entry in a first table and a second entry in a second table, wherein each of said first entry and said second entry comprises one or more ray-specific records, and wherein each of said ray-specific records comprises a ray-specific entry point coordinate and a ray-specific exit point coordinate,
identifying those rays as going through the voxel for which the range between ray-specific entry and exit point coordinates comprised in said first entry has a non-empty intersection with the range between ray-specific entry and exit point coordinates comprised in said second entry, and
using the ray-specific entry and exit point coordinates of the endpoints of said non-empty intersection to indicate points at which the corresponding ray penetrates the sides of the voxel.

11. A computer program or product stored on a nonvolatile storage medium and comprising machine-readable instructions that, when executed by a processor, are configured to cause the implementation of a method comprising
mapping the target region with a grid, and describing a number of voxels in the grid with voxel-specific unknowns,
representing said unknowns with components of a vector-valued variable,
repeatedly generating a next version of said vector-valued variable by drawing for each component a value from a conditional distribution, and
using the components of a so generated version of said vector-valued variable as said electronic representation;
wherein:
the computer program or product is configured to store a theory matrix, elements of which indicate, what is the contribution of each voxel in the grid to a detection result obtained at a particular pixel of a detector, in a compressed form, and
the computer program or product is configured to decompress only a subset of the elements of the theory matrix from said compressed form for updating the quantity Ax, where A is the theory matrix and x is the vector-valued variable, after said generating of a next version of said vector-valued variable, and calculating the quantity A jT (Ax), where A is the theory matrix, A jT is the transpose of the j:th column of the theory matrix, and x is the vector-valued variable
and for decompressing a column of elements of the theory matrix, which column corresponds to a voxel of the grid, the computer program or product is configured:
to use two perpendicular projections of said voxel and of the rays of a ray model to identify one or more rays that go through the voxel and to find the points at which said one or more rays penetrate the sides of the voxel, and
to calculate uncompressed values of said elements by scaling the projected length of each section of said one or more rays that falls within said voxel with a scaling factor proportional to the whole length of the respective ray;

wherein:

said using of two perpendicular projections of said voxel and of said rays of the ray model comprises:

using coordinates of said voxel to identify a first entry in a first table and a second entry in a second table, wherein each of said first entry and said second entry comprises one or more ray-specific records, and wherein each of said ray-specific records comprises a ray-specific entry point coordinate and a ray-specific exit point coordinate, identifying those rays as going through the voxel for which the range between ray-specific entry and exit point coordinates comprised in said first entry has a non-empty intersection with the range between ray-specific entry and exit point coordinates comprised in said second entry, and using the ray-specific entry and exit point coordinates of the endpoints of said non-empty intersection to indicate points at which the corresponding ray penetrates the sides of the voxel.

12. A method according to claim 2, wherein:

the compressed form of the theory matrix comprises a column-specific record for each column that has non-zero elements in the theory matrix, the column-specific record comprises an element-specific entry for each non-zero element of that column in the theory matrix, said element-specific entry comprises: a first field, a value of which identifies a ray-specific record in said first entry of said first table; a second field, a value of which identifies a ray-specific record in said second entry of said second table; a third field, a value of which indicates, from which of said first and second entries said ray-specific entry point coordinate is to be read; and a fourth field, a value of which indicates, from which of said first and second entries said ray-specific exit point coordinate is to be read.

\* \* \* \* \*